US012598648B2

(12) United States Patent

Xin et al.

(10) Patent No.: US 12,598,648 B2

(45) Date of Patent: Apr. 7, 2026

(54) ENHANCED QUALITY OF SERVICE STATUS REPORT THAT SUPPORTS LATENCY REQUIREMENTS

(71) Applicants: SONY GROUP CORPORATION, Tokyo (JP); SONY CORPORATION OF AMERICA, New York, NY (US)

(72) Inventors: Liangxiao Xin, Santa Clara, CA (US); Li-Hsiang Sun, San Jose, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 302 days.

(21) Appl. No.: 18/234,951

(22) Filed: Aug. 17, 2023

(65) Prior Publication Data

US 2024/0080891 A1 Mar. 7, 2024

Related U.S. Application Data

(60) Provisional application No. 63/375,831, filed on Sep. 15, 2022, provisional application No. 63/374,658, filed on Sep. 6, 2022.

(51) Int. Cl.
*H04W 74/0816* (2024.01)
*H04W 24/10* (2009.01)
(Continued)

(52) U.S. Cl.
CPC ....... *H04W 74/0816* (2013.01); *H04W 24/10* (2013.01); *H04W 28/0278* (2013.01);
(Continued)

(58) Field of Classification Search
None
See application file for complete search history.

(56) References Cited

U.S. PATENT DOCUMENTS

| | | |
|---|---|---|
| 11,418,999 B2 | 8/2022 | Li |
| 2020/0413285 A1 | 12/2020 | Li |
| 2025/0142396 A1* | 5/2025 | Ajami .................. H04W 72/21 |

FOREIGN PATENT DOCUMENTS

| | | |
|---|---|---|
| EP | 4114076 A1 | 1/2023 |
| JP | 6972021 B2 | 11/2021 |

(Continued)

OTHER PUBLICATIONS

IEEE: "Draft Standard for Information technology—Telecommunications and information exchange between systems Local and metropolitan area networks—Specific requirements, Part 11 : Wireless LAN Medium Access Control (MAC) and Physical Layer (PHY) Specifications, Amendment 8: Enhancements for extremely high throughput (EHT)", IEEE Draft; Draft P802.11 be_D2.0_ Redline_Compared_to_D1 .5, IEEE—SA, Piscataway, NJ USA , vol. 802.11 be drafts, No. D2.0 May 23, 2022 (May 23, 2022), pp. 1-933, XP068192044

(Continued)

*Primary Examiner* — Walter J Divito
(74) *Attorney, Agent, or Firm* — O'BANION & RITCHEY LLP; John P. O'Banion

(57) ABSTRACT

Protocol enhancements for IEEE 802.11 handling of Buffer Status Reports (BSRs) to provide real-time information on Quality of Service (QoS) requirements. A non-AP STA can report QoS status about portions of a buffer, which then allows the AP to schedule transmissions for those buffers toward satisfying their QoS requirements. The non-AP STA can also change parameters of the QoS characteristics element of an existing SCS to allow the AP to schedule transmission for the SCS traffic with the new parameters immediately. The non-AP STA can also report on buffers that should soon arrive to allow the AP to trigger the transmis-
(Continued)

sion before those buffers arrive. Additional benefits are also provided.

18 Claims, 13 Drawing Sheets

(51) Int. Cl.
    *H04W 28/02*        (2009.01)
    *H04W 72/566*     (2023.01)
    *H04W 84/12*        (2009.01)
    *H04W 88/06*        (2009.01)
(52) U.S. Cl.
    CPC .......... *H04W 72/569* (2023.01); *H04W 84/12* (2013.01); *H04W 88/06* (2013.01)

(56)              References Cited

FOREIGN PATENT DOCUMENTS

| | | | |
|---|---|---|---|
| WO | 2021066282 | A1 | 4/2021 |
| WO | WO-2021185211 | A1 | 9/2021 |

OTHER PUBLICATIONS

Liangxiao Xin (Sony): "LB266 CR for CIDs 10710, 12711", IEEE Draft; 11-22-1278-00-00BE-LB266-CR-for-CIDS-10710-12711, IEEE—SA Mentor, Piscataway, NJ USA vol. 802.11 EHT; 802.11 be Sep. 6, 2022, pp. 1-7, XP068193596.

Pascal Viger (Canon): "CR for Low-Latency stream identification", IEEE Draft; 11-21-1686-01-00BE-CR-for-low-latency-stream Identification, IEEE—Sa Mentor Piscataway, NJ USA, vol. 802.11 EHT; 802.11 be, No. 1 Jan. 20, 2022, pp. 1-11, XP068188504.

* cited by examiner

| B0          B3 | B4          B5 | B6          B7 | B8          B9 | B10          B17 | B18          B |
|----------------|----------------|----------------|----------------|------------------|----------------|
| ACI Bitmap | Delta TID | ACI High | Scaling Factor | Queue Size High | Queue Size All |

Bits:          4                    2                    2                    2                    8                    8

Example 3

| SCSID | Field of QoS Characteristics element | Offset Value |
|---|---|---|
| 8 | 4 | 14 |

B0　　B7　B8　　B11　B12　　　B25

Bits

450

Example 4

| SCSID | Buffer size | Token of SCS | Greedy Starting |
|---|---|---|---|
| 8 | 8 | 8 | 1 |

B0　B7　B8　　B15　B16　　B23　B24

Bits

470

ENHANCED QUALITY OF SERVICE STATUS REPORT THAT SUPPORTS LATENCY REQUIREMENTS

CROSS-REFERENCE TO RELATED APPLICATIONS

This application claims priority to, and the benefit of, U.S. provisional patent application Ser. No. 63/374,658 filed on Sep. 6, 2022, incorporated herein by reference in its entirety. This application claims priority to, and the benefit of, U.S. provisional patent application Ser. No. 63/375,831 filed on Sep. 15, 2022, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless networks, and more particularly to enhanced buffer status reporting for real-time application (RTA) traffic.

2. Background Discussion

Current IEEE 802.11 protocols (i.e., 802.11be) allow the AP to collect buffer status information from non-AP STAs, using Buffer Status Report (BSR) mechanisms.

However, current Buffer Status Report (BSR) mechanisms are unable to provide real-time information of the QoS requirements, and thus lead to inefficient resource allocations, in particular in regard to transmission of Real Time Application (RTA) traffic, whose delivery time according to its QoS requirements is subject to expiration.

Accordingly, a need exists for a means for more efficiently supporting RTA traffic when using a BSR. The present disclosure fulfills that need and provides additional benefits over existing systems.

BRIEF SUMMARY

A wireless communication apparatus/method/protocol to allow transmission of frames between Medium Access Control (MAC) layers of the IEEE 802.11 network, performing transmission of Physical Layer Protocol Data Units (PP-DUs) between the Physical (PHY) layers of the IEEE 802.11 network in stations (STAs) using Carrier Sense Multiple Access/Collision Avoidance (CSMA/CA) for channel contention. Non-Access Point (non-AP) STAs can transmit an enhanced Quality of Service (QoS) Status Report (QSR) to the AP that indicates latency requirements of a certain amount (portion, such as a block) of its buffered traffic. The AP schedules trigger-based (TB) transmissions for the buffered traffic in QSR to satisfy latency requirements of that buffered traffic. The QSR carries traffic identification information, such as Access Class (AC), Traffic Identifier (TID), Stream Classification Service ID (SCSID) of the buffered traffic.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

1. Introduction to Buffer Status Report

In the current IEEE 802.11be protocol, the AP can collect buffer status information from non-AP STAs, by sending a Buffer Status Report Poll (BSRP) trigger frame to request a Buffer Status Report (BSR) from the non-AP STAs. After receiving the BSRP trigger frame, the non-AP STA shall include one or more Quality of Service (QoS) Null frames with QoS Control fields and BSR Control subfields in a High Efficiency (HE) Trigger-Based (TB) Physical Layer Protocol Data Unit (PPDU). The BSR can be carried in the BSR control subfield and the QoS control field of the frames.

Figure 1:
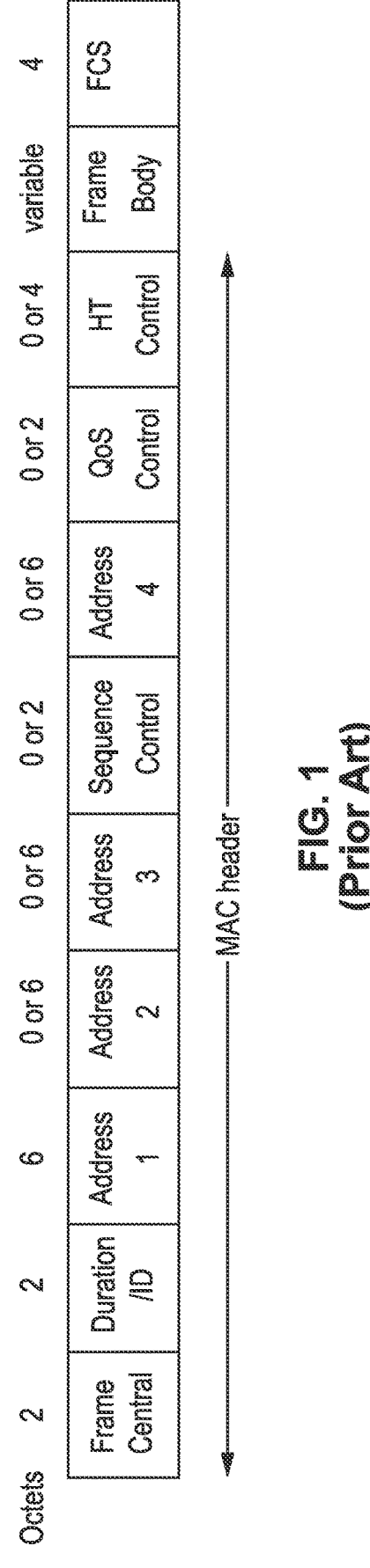
FIG. 1 is a Medium Access Control (MAC) frame format under IEEE 802.11.

FIG. 1 depicts a Medium Access Control (MAC) frame format, shown with fields of Frame Control, Duration/ID, Address 1-Address 3, Sequence Control, Address 4, QoS Control, HT Control, Frame Body, and ending with a Frame Check Sequence (FCS).

The QoS Control field reports the buffer status at the Access Category (AC) level and can be carried in the QoS data or QoS Null frame.

Figures 2, 3:
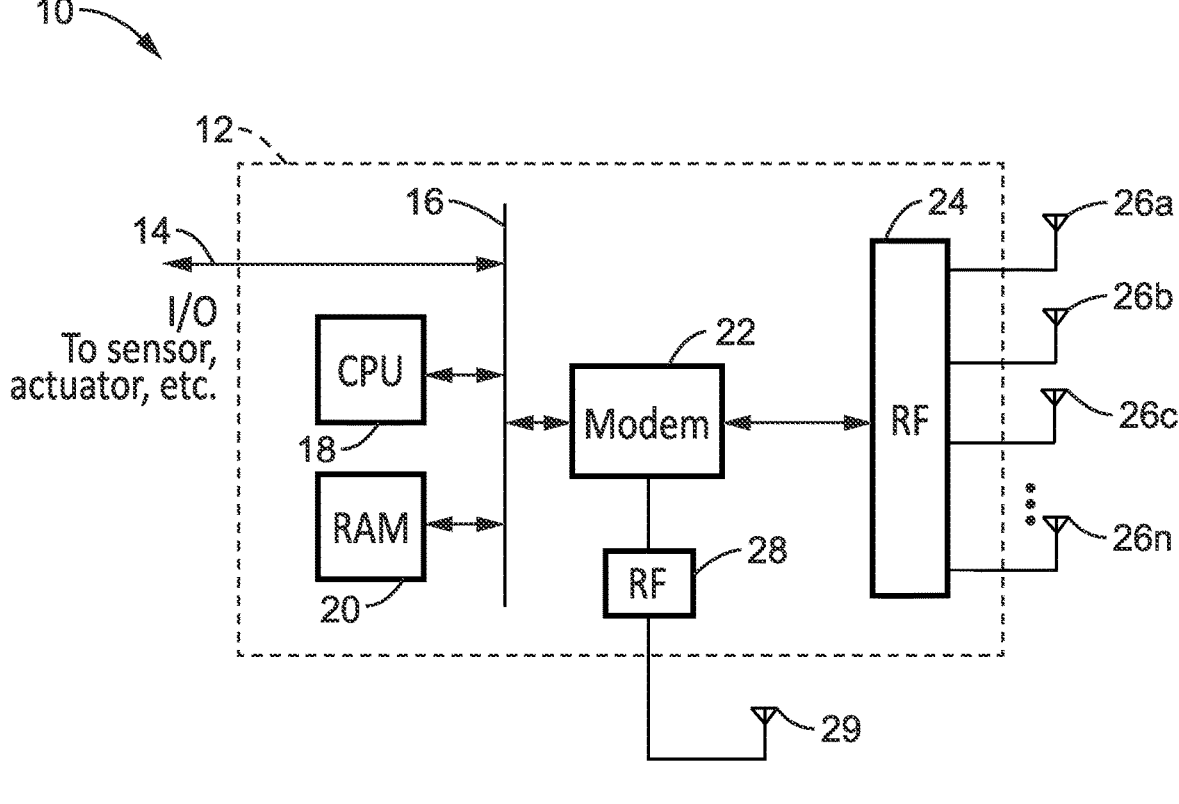
FIG. 2 is a Buffer Status Report (BSR) Control subfield.
FIG. 3 is a block diagram of communication station hardware, according to at least one embodiment of the present disclosure.

FIG. 2 depicts a Buffer Status Report (BSR) Control subfield which reports the buffer status of a Transmission Identification (TID) and can be carried in the High Throughput (HT) control field in QoS data or QoS Null frame or management frame. The BSR control subfield is shown with the following subfields: Adjacent Channel Interference (ACI), Delta TID, ACI High, Scaling Factor, Queue Size High, and Queue Size All.

A non-AP STA can send an unsolicited BSR to the AP. For an unsolicited BSR, the non-AP STA can aggregate one or more QoS data or QoS Null frames carrying QoS control fields in an Aggregated-MPDU (A-MPDU) to report the buffer status for different TIDs.

The BSR control subfield is used for containing information for reporting the buffer status of one or more ACs. In a MAC frame of IEEE 802.11, the QoS control field can be used to report the Queue Size and the TXOP Duration Requested.

Table 1 illustrates contents of different frame types and sub-types. The table shows the applicable frame types and subtypes along with the use of specific bit settings for that type/sub-type.

2. Problem Statement

The current Buffer Status Report (BSR) mechanism is unable to provide real-time information of the QoS requirements, such as expiration time, of the data in the buffer. This inability can lead to situations in which the AP allocates resources for the transmission of traffic, specifically Real Time Application (RTA) traffic, whose delivery time according to its QoS requirements has already expired; thus, wasting communication resources.

For traffic that is subject to stringent latency requirements, the AP would need to immediately allocate resources for transmission. However, in current protocols, the AP may not even be aware of the existence of those latency requirements until it transmits a BSRP.

3. Contributions of the Present Disclosure

The following describes some of the principle contributions of the present disclosure.

(A) The disclosed technology provides a mechanism whereby the non-AP STA can report the QoS status of a certain portion of the buffers, so that the AP can schedule the transmissions for those buffers to satisfy their QoS requirement.

(B) The disclosed technology provides a mechanism whereby the non-AP STA can change the parameters of the QoS characteristics element of an existing Stream Classification Service (SCS), to allow the AP to schedule transmissions for SCS traffic with new parameters immediately.

(C) The disclosed technology provides a mechanism whereby the non-AP STA can report a buffer having traffic that will be arriving in the near future (e.g., "expected trigger time" seen in FIG. 14) which allows the AP to start to trigger the transmission before those buffer arrives.

4. HW Communication Embodiments 4.1. Communication Station (STA and MLD) Hardware FIG. 3 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication protocol and context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a multi-link device (MLD), which typically will have a processor and memory for coordinating activity, although it should be appreciated that these resources may be shared as there is not always a need for a separate CPU and memory for each STA within the MLD.

Figure 4:
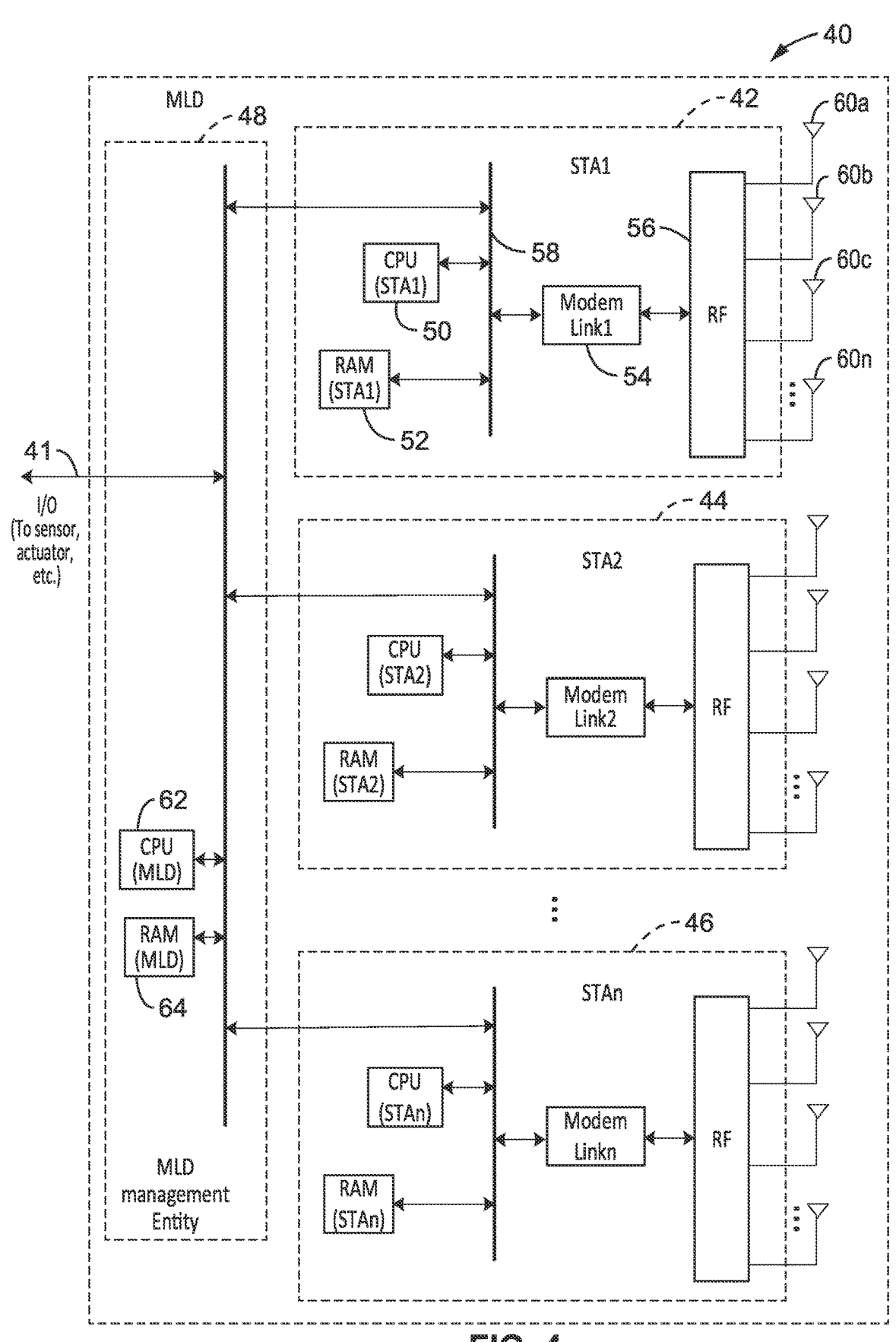
FIG. 4 is a block diagram of Multi-Link Device (MLD) hardware according to at least one embodiment of the present disclosure.

FIG. 4 illustrates an example embodiment 40 of a Multi-Link Device (MLD) hardware configuration. It should be noted that a "Soft AP MLD" is a MLD that consists of one or more affiliated STAs, which are operated as APs. A soft AP MLD should support multiple radio operations, for example on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

5. QoS Status Report

The disclosed technology allows a non-AP STA to report its QoS requirement and/or status of its buffer to the AP. The QoS requirement and/or status can be carried in different ways, such as by using a QoS Status Report (QSR) which can be carried in an A-Control subfield of the HT Control field of a QoS data frame or QoS Null frame. According to the QSR, the AP can schedule and allocate resources for transmission of the corresponding data reported in the QSR to satisfy their QoS requirements.

The QSR can provide expiration information (times) of a desired portion of the buffer. When a non-AP STA reports such a QSR, this then allows the AP to generate a trigger to complete the transmissions of those buffers before the expiration time of their associated data. The same buffer cannot be reported by multiple QSRs in the same PPDU.

The QSR can carry additional complementary information, when the QoS information of the QoS control subfield in the same frame is not sufficient. Then, the QoS information is for the same TID traffic reported in the QoS control subfield.

Multiple QSRs can be carried in the same PPDU. In addition, the QSRs of a TID in a PPDU can override the QSRs of the same TID in the previous PPDU. Through using the QSR of the present disclosure parameters can be changed for an existing QoS characteristics element and for reporting the status of the existing SCS traffic streams. Using the QSR of the present disclosure allows the QSR to be used for indicating that the buffer will arrive at the R-TWT member STA in the near future (i.e., immediate future in relation to delivery requirements of buffered RTA data), but requires that the transmission be finished (completed) before the end of the current R-TWT SP.

6. Operational Example Data Structures 6.1. Example 1

In this Example 1, the QSR is utilized for reporting buffer size of a TID with its expiration time.

Figures 5, 6:
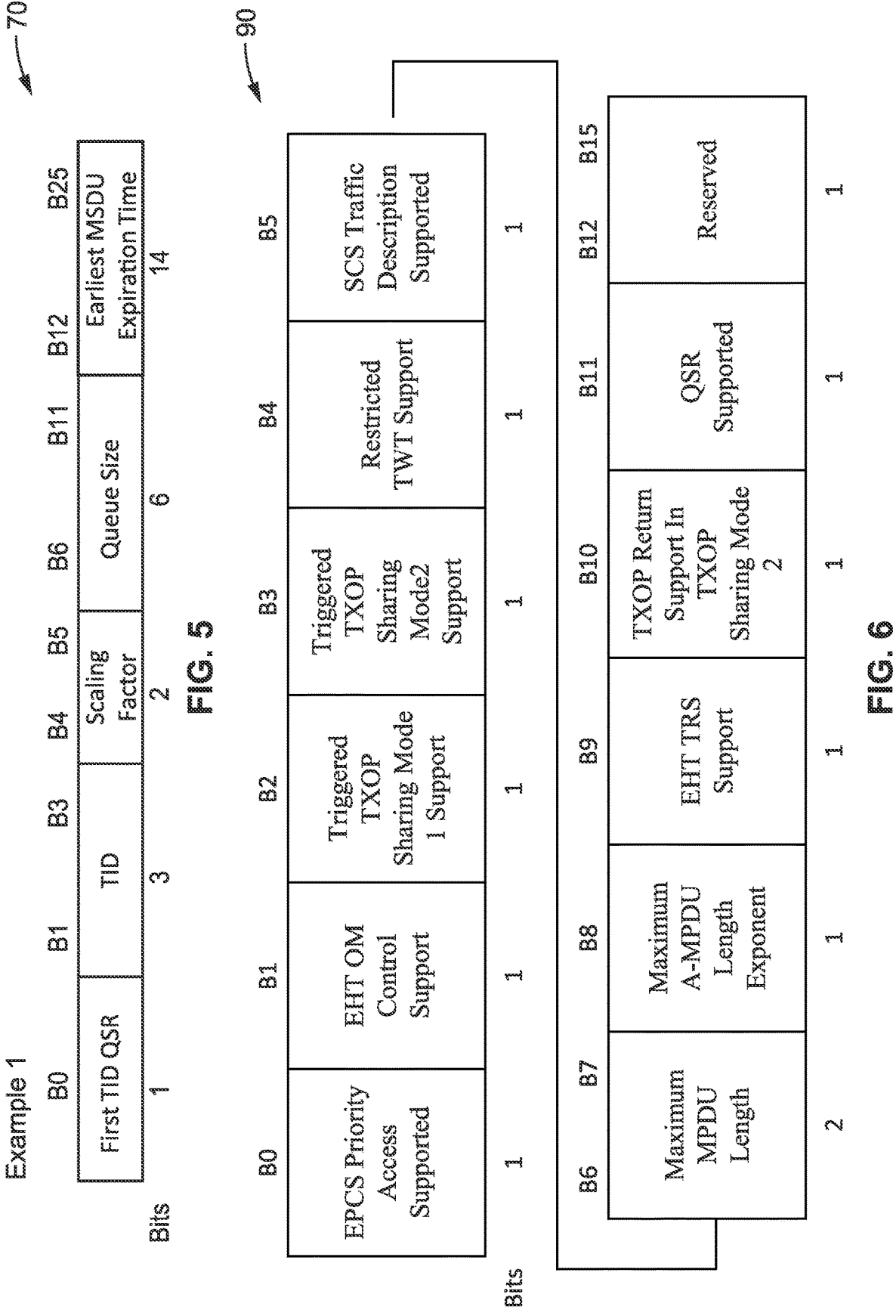
FIG. 5 is a data field diagram of a Control Information subfield format in a QSR Control subfield, as part of Example 1, according to at least one embodiment of the present disclosure.
FIG. 6 is a data field diagram of Extra High Throughput (EHT) MAC Capabilities Information field format, according to at least one embodiment of the present disclosure.

FIG. 5 illustrates an example embodiment 70 of a Control Information subfield format in a QSR Control subfield. The format of QSR is shown as carried in the A-Control subfield of the HT Control field. It should be appreciated that the bit size (width) of each subfield in the QSR can be changed. The Control Information subfield in a QSR Control subfield contains QoS status information used for an UpLink (UL) Multiple User (MU) operation (e.g., as found in Section 26.5.2 (UL MU operation)) of IEEE 802.11be D2.0 specification.

The First TID QSR subfield indicates that the QSR Control subfield is the first QSR Control subfield of the TID identified by the TID subfield transmitted in the same PLCP Service Data Unit (PSDU) (PLCP stands for PHY Layer Convergence Protocol) if the First TID QSR subfield is set to a first state (e.g., "1"); otherwise, it is set to a second state (e.g., "0").

The TID subfield indicates the Transmission Identifier (TID) for which the QoS status is reported.

The Scaling Factor (SF) subfield indicates the units of the SF, in octets, of the Queue Size subfields. The Queue Size subfield indicates the amount of buffered traffic, in units of SF octets, for the TID identified by the TID subfield that is intended for the STA identified by the receiver address of the frame containing the QSR Control subfield, which is to be delivered before the earliest MSDU expiration time except for those portions of the buffered traffic that is reported in the other QSR Control subfield(s) with earlier expiration time(s) in the same PSDU.

The size value in the Queue Size subfield is set to be less than, or equal to, the total size of the Queue, as rounded up to the nearest multiple of SF octets, of all MAC Service Data Units (MSDUs) and Aggregated-MSDUs (A-MSDUs) buffered at the MLD (including the MSDUs or A-MSDUs of the SCS traffic streams in the same PSDU as the frame containing the QSR Control subfield) in the delivery queues used for MSDUs and A-MSDUs with TID that are specified in the TID subfield.

The following should be noted about these subfield values. (a) The total size is based on data received by the STA at the MAC Service Access Point (SAP) (MA-UNITDA-TA.request). Data in the layers above the MAC layer are not taken into account (considered). (b) Buffered MSDUs are those that have been received in an MA-UNITDATA.request which have not as yet been successfully transmitted, but have not been discarded. (c) The queue size includes the sizes of the MSDUs and A-MSDUs in the same PSDU with the same TID and the same earliest expiration time indicated in this QSR Control subfield.

The queue size value can indicate special conditions as well; for example, in one embodiment a queue size value of a first set value (e.g., 62) in the Queue Size subfield indicates that the amount of buffered traffic is greater than the first set value times the SF octets (e.g., 62×SF octets). A queue size value of a second set value (e.g., 63) in the Queue Size subfields indicates that the amount of buffered traffic is an unspecified or unknown size.

The queue size value of the QoS Data frames containing the fragments may remain constant in all fragments even if the amount of queued traffic changes as successive fragments are transmitted (refer to Section 10.23.3.5.1 (General) in the IEEE 802.11be D2.0 specification. If the QoS Data frames containing fragments are carried in the A-MPDU, the queue size values of the MPDUs containing the fragments are set according to the rules in Section 10.18 (HT Control field operation) of the same specification.

In at least one embodiment, the Queue size subfield can be replaced by the TXOP duration requested to indicate that the non-AP expects the AP to trigger TXOP sharing with it for the duration, as indicated in this subfield before the earliest MSDU expiration time.

The Earliest MSDU Expiration Time subfield contains an unsigned integer that specifies the time, in microseconds (μs), when a first MSDU or A-MSDU indicated in the Queue Size subfield has reached its delay bound as indicated in the corresponding QoS characteristics element. In the present example embodiment, the field represents the 14 lower order bits of the TSF timer at the time when the first MSDU or A-MSDU indicated in the Queue Size subfield reaches its delay bound. The field shall be set to a value which represents the TSF timer of the link where the QSR control subfield is transmitted after the end time of the PPDU containing the QSR Control subfield (or the time in units of ms or μs, since the end of the PPDU carrying the QSR).

It should be noted that the expiration time, as described in this disclosure, can be set to the Timing synchronization function (TSF) timer or the time in units of ms or μs as in the earliest MSDU expiration time subfield here.

Table 2 shows Control ID Subfield values for an embodiment of the present disclosure.

FIG. 6 illustrates an example embodiment 90 of an Extra High Throughput (EHT) MAC Capabilities Information field format.

A non-AP STA delivers QoS status reports (QSRs) to assist its associated AP in allocating UL MU resources to satisfy the QoS requirements of the traffic to be delivered by the non-AP STA. The non-AP STA can implicitly deliver QSRs, in the QSR Control subfield of any frame transmitted to the AP (unsolicited QSR), or explicitly deliver QSRs in the QSR Control subfield of any frame sent to the AP in response to a Buffer Status Report Poll (BSRP) Trigger Frame (TF) (solicited QSR). In at least one embodiment, the QoS status reported in the QSR Control field comprises one TID, one queue size and one earliest MSDU expiration time (refer to Section 9.2.4.7.xx (QSR Control)) of the IEEE 802.11be D2.0 specification.

An EHT STA shall set the QSR Support subfield in the EHT Capabilities element it transmits to a first value (e.g., "1") if the setting for the EHT QSR Control (dot11EHTQSRControlImplemented) is set to true; otherwise, the EHT STA shall set the QSR Support subfield to a second state (e.g., "0").

An EHT STA with the QSR Support subfield set to a first state (e.g., "1") shall follow the rules as defined in Section 26.5.5 (Buffer status report operation) of the IEEE 802.11be D2.0 specification, to report its buffer status to the AP and the additional rules as defined below to report QoS status to the AP.

A non-AP STA reports its QoS status (unsolicited QSR) to the AP with which it is associated in the QSR Control subfield (if present) in QoS Null, QoS Data and Management frames as defined below:

The EHT STA may report the QoS status in the QSR Control subfield of frames it transmits, if the AP has indicated its support in the QSR Support subfield of its EHT Capabilities element; otherwise, the STA shall not report the QoS status in the QSR Control subfield.

The EHT STA shall report the TID, the queue size and the earliest MSDU expiration time of the buffered traffic in the TID subfield, the Queue Size subfield, and the earliest MSDU Expiration Time subfield of the QSR Control subfield. The EHT STA may set the queue size to be less than or equal to the total size of all the MSDUs and A-MSDUs buffered in the TID.

The non-AP STA may transmit a PPDU carrying more than one QoS Null, QoS data, and management frames, and each frame in the PPDU can carry one QSR control subfield. Those QSR control subfields in the PPDU can be used to report QoS status of the same TID. If there are multiple QSR control fields reporting the QoS status of a same TID, then each QSR control field reports the QoS status of the partial buffer of the TID. In regard to the a given (same) portion of the buffer of the TID; this cannot be reported in more than one QSR control field in the PPDU. The QSR Control subfield with an earlier time of the earliest MSDU expiration time shall be transmitted earlier in the PPDU.

An AP can also solicit one or more associated non-AP STAs for their QSR(s) and/or BSR(s) by sending a BSRP Trigger frame (refer to Section 9.3.1.22.6 (BSRP Trigger frame format)) (IEEE 802.11be D2.0 specification). The non-AP STA responds (solicited QSR) as defined below.

The non-AP STA that receives a BSRP Trigger frame shall follow the rules defined in Section 26.5.2.3 (Non-AP STA behavior for UL MU operation) of IEEE 802.11be D2.0 specification to generate the TB PPDU if the Trigger frame contains the 12 LSBs of the non-AP STA's AID in any of the User Info fields; otherwise if the buffers of the non-AP STA are not empty, and the non-AP STA supports the Uplink OFDMA-based Random Access (UORA) procedure, it may follow the rules defined in Section 26.5.4 (UL OFDMA-based random access (UORA)) (IEEE 802.11be D2.0 specification) to gain access to an RA-RU and generate the TB PPDU when the Trigger frame contains one or more RA-RUs.

The non-AP STA shall include in the TB PPDU one or more QoS Null frames containing one or more QSR Control subfields with the TID subfield, the Queue Size subfield and the Earliest MSDU Expiration Time sub-field indicating that the non-AP STA has the queue size of the specified TID to be delivered to the AP before the earliest MSDU expiration time; if the non-AP STA has buffered SCS traffic with a delay bound requirement and the AP has indicated its support in the QSR Support subfield of its EHT Capabilities element.

The non-AP STA may include in the TB PPDU more than one QoS Null frame containing more than one QSR Control subfields for the same TID subfield. The non-AP STA is not to count the same value of queue size in multiple QSR Control subfields in the same TB PPDU. The QSR Control subfield with an earlier time of the earliest MSDU expiration time shall be transmitted earlier in the PPDU.

The non-AP STA shall not solicit an immediate response for the frames carried in the TB PPDU (e.g., the Ack Policy Indicator subfield of a QoS Null frame shall not be set to Normal Ack or Implicit BAR).

The subfields of the EHT MAC capabilities information field have a QSR supported subfield which for an AP, indicates support for receiving a frame with a QSR Control subfield. For a non-AP STA, this QSR supported subfield indicates support for generating a frame with a QSR Control subfield. The encoding of the subfield of the +HTC-HE Support subfield is set to a first state (e.g., "1") indicating the STA supports the QSR Control subfield functionality; and otherwise, the value is set to a second state (e.g., "0"). And this subfield is reserved if the +HTC-HE Support subfield is set (e.g., "0") to indicate there is no +HTC-HE support.

6.2. Example 1-1

Figure 7:
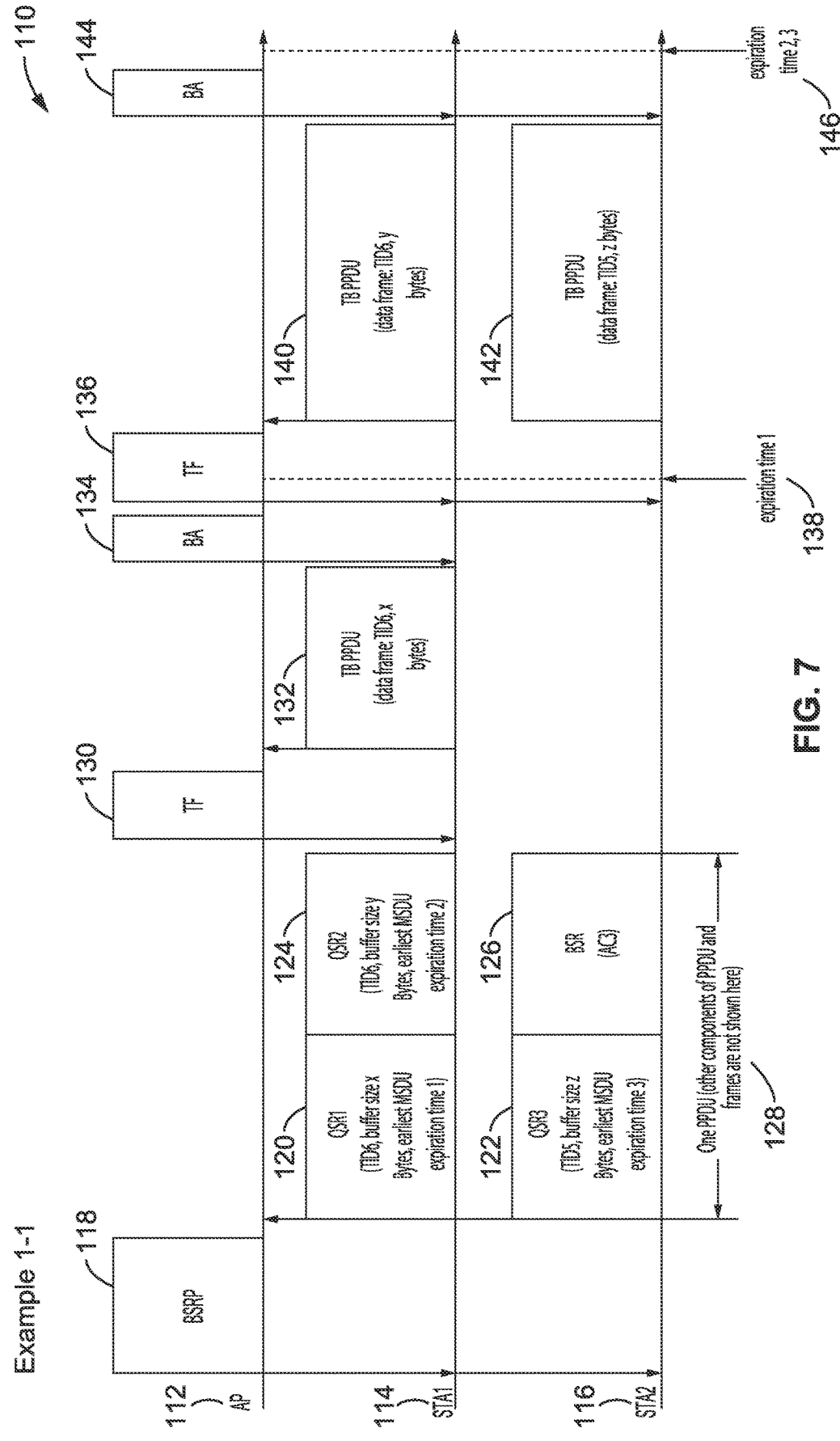
FIG. 7 is a communications diagram, as Example 1-1, of QSR reporting buffer size of a TID with expiration time, according to at least one embodiment of the present disclosure.

FIG. 7 illustrates an Example 1-1 as embodiment 110 of QSR reporting of buffer size of a TID with expiration time. The format of QSR is shown in FIG. 2 and is carried in QoS Null frame.

In this example, communications are seen between an AP 112, STA1 114 and STA2 116. The AP sends a BSRP trigger frame 118 to its associated STAs, STA1 and STA2. Then, STA1 responds with two QSRs, denoted as QSR1 120 and QSR2 124, in one PPDU 128. In QSR1, STA1 reports that it has a buffer size of x bytes of TID6 among which the earliest MSDU expiration time is denoted as expiration time 1. In QSR2, STA1 reports that it has a buffer size of y bytes of TID6 among which the earliest MSDU expiration time is denoted as expiration time 2. From this information, the AP can recognize that STA1 has x bytes of TID6 to be triggered before expiration time1, and another y bytes of TID6 to be triggered before expiration time2. It will be noted that QSR1 sets its First TID QSR subfield to a first state (e.g., "1") and QSR2 sets its First TID QSR subfield to a second state (e.g., "0").

Meanwhile, STA2 responds with one QSR, denoted as QSR3 122, and one BSR 126 in one PPDU 128. In QSR3, STA2 reports that it has a buffer size of z bytes of TID5 among which the earliest MSDU expiration time is denoted as expiration time 3. In the BSR, STA2 reports the buffer size of AC3 as defined in IEEE 802.11be. Accordingly, the AP is able to recognize that STA2 has z bytes of TID5 to be triggered before expiration time 3 while a specified portion of the buffer size of AC3 does not have expiration time.

In order to satisfy the requirement of the expiration times reported by the QSRs of STA1 and STA2, the AP triggers 130 x bytes of TID6 132 from STA1 first to finish those bytes before expiration time 1. After which the AP sends Block Ack (BA) 134. Then, the AP triggers 136 y bytes of TID6 140 from STA1 and z bytes 142 of TID5 from STA2 to finish those bytes before their expiration times. And again, the AP responds with a BA 144. The expiration time 1 is depicted 138 and expiration times 2 and 3 as 146.

6.3. Example 1-2

Figure 8:
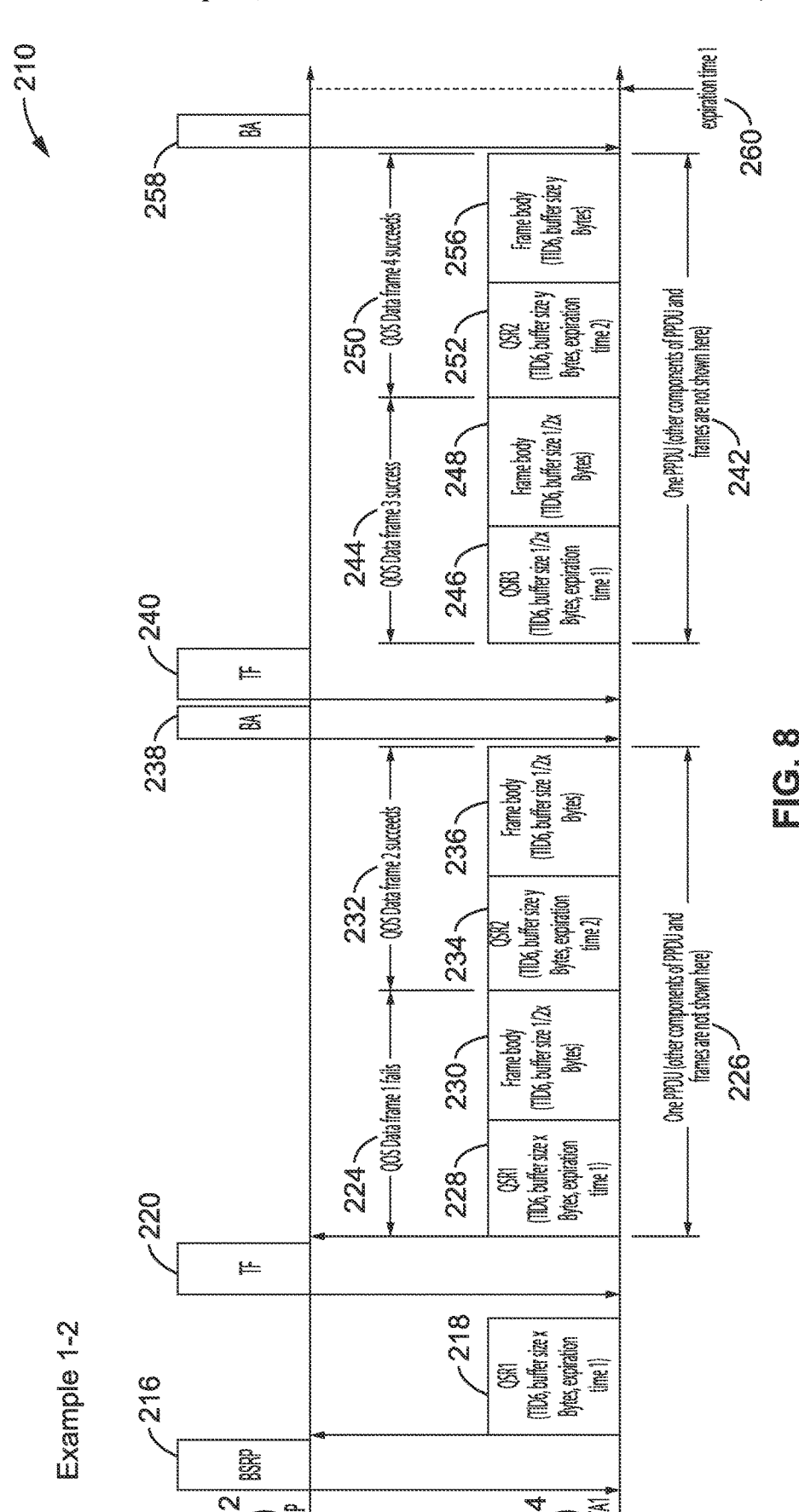
FIG. 8 is a communications diagram, as Example 1-2, of a QSR reporting buffer size of a TID with its expiration time, according to at least one embodiment of the present disclosure.

FIG. 8 illustrates an Example 1-2 embodiment 210 of a QSR reporting buffer size of a TID with its expiration time. The figure illustrates communications between an AP 212 and STA1 214, to exemplify the QSR being carried in a QoS data frame.

The AP sends a BSRP trigger frame 216 to its associated STAs, herein the figure only depicts STA1. Then, STA1 responds with one QSR, denoted as QSR1 218. In QSR1, STA1 reports that it has a buffer size of x bytes of TID6 among which the earliest MSDU expiration time is denoted as expiration time1. In view of receiving this, the AP recognizes that STA1 has x bytes of TID6 to be triggered before expiration time1. The AP sends TF 220, in response to which STA1 transmits one PPDU 226.

PPDU 226 carries two QoS data frames denoted as QoS data frame1 224 and frame2 232, to the AP. QoS data frame1 carries QSR1 228, which reports the duplicated information as in the response to BSRP, and a frame body 230. However, in this example this frame1 exchange fails.

QoS data frame 2 232 carries QSR2 234 which reports another y bytes of TID6 with the earliest MSDU expiration time denoted as expiration time 2, and has a frame body 236. Each of QoS data frames carries one-half of the x bytes of data reported by QSR1. Thus, it is seen here that although QoS data frame1 fails; QoS data frame2 has succeeded.

In at least one embodiment, the AP estimates the length of the data frame carried by QoS data frame1 by the Modulation Coding Scheme (MCS), duration, and BW. Thus, the AP can recognize that it didn't receive half of the x bytes of TID6 successfully. The AP, at least recognizes the transmission failure of QoS data frame1 and re-triggers the retransmission with QoS Data frame 2 232, which then succeeds.

Also, since STA1 reported in the QSR 234 that it has another y bytes of TID6 to be transmitted before expiration time 2; the AP sends another trigger frame 240 to trigger the transmission for half of the x bytes of TID6 246 and another y bytes of TID6 from STA1.

In response to the second TF 240 from the AP, STA1 transmits two data frames, denoted as QoS data frame 3 244 and QoS data frame 4 250, in one (TB) PPDU 242. In QoS data frame 3, it carries QSR3 246 which indicates that it still has one-half of the x byte buffer size of TID6 with expiration time 1 and those one-half of the x bytes of data in frame body 248.

In QoS data frame 4 250, it carries QSR2 252 (which is duplicated from QoS data frame2) and the y type data in frame body 256. The AP responds with BA 258. Expiration time 1 is shown having an expiration time 260 after BA 258, thus the transmission succeeded.

6.4. Example 2

Example 2 illustrates a QSR reporting QoS status associated with a QoS Control subfield in the same frame.

Figure 9:
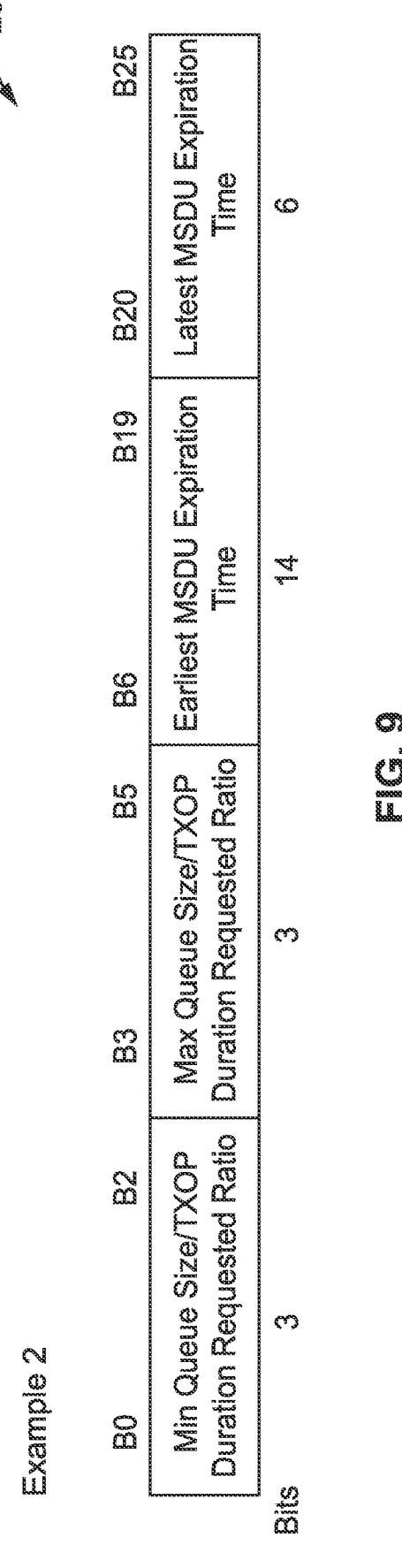
FIG. 9 is a data field diagram of a Control Information subfield in a QSR Control subfield, as part of Example 2, according to at least one embodiment of the present disclosure.

FIG. 9 illustrates an example embodiment 290 showing the format of a Control Information subfield in a QSR Control subfield. The QSR is carried in A-Control subfield of the HT Control field and can be used with the QoS control subfield in the same frame. It should be noted that the bit sizes (subfield widths) described for each subfield in the QSR subfield are described by way of example and not by way of limitation; these values can be modified without departing from the teachings of the present disclosure. The control information subfield of the QSR has the following subfields.

A Min Queue Size/TXOP Duration Requested Ratio subfield is set to the percentage of the Queue Size/TXOP duration requested starting from the first MSDU or A-MSDU (or the first byte) reported in the QoS control subfield in the same QoS Null/data frame. This field represents Queue size ratio when the QoS control subfield reports the queue size. This field represents TXOP duration requested ratio when the QoS control subfield reports the TXOP duration requested.

A Max Queue Size/TXOP Duration Requested Ratio subfield is set to the percentage of the Queue Size/TXOP duration requested starting from the first MSDU or A-MSDU (or the first byte) reported in the QoS control subfield in the same QoS Null/data frame. This field represents Queue size ratio when the QoS control subfield reports the queue size. This field represents a TXOP duration requested ratio when the QoS control subfield reports the TXOP duration requested.

An Earliest MSDU expiration time subfield is set to the earliest expiration time of the MSDUs or A-MSDUs between the Min Queue Size/TXOP Duration Requested Ratio and Max Queue Size/TXOP Duration Requested Ratio.

A Latest MSDU expiration time subfield is set to the latest expiration time of the MSDUs or A-MSDUs between the Min Queue Size/TXOP Duration Requested Ratio and Max Queue Size/TXOP Duration Requested Ratio.

In at least one embodiment, a TXOP Duration request is determined based on bandwidth; for example, a 20 MHz bandwidth or other bandwidth size, such as 40 MHz, 80 MHz, 160 MHz, or 320 MHz, is denoted as the reference bandwidth. The reference bandwidth size can, such as in at least one example embodiment, be predetermined by the network system. Then, the AP may adjust the TXOP sharing duration based on the actual bandwidth it occupies and has shared with the non-AP STA. For example, the actual TXOP sharing duration can be (TXOP duration requested in QSR/reference bandwidth size)*actual bandwidth size.

6.5. Example 2-1

Figure 10:
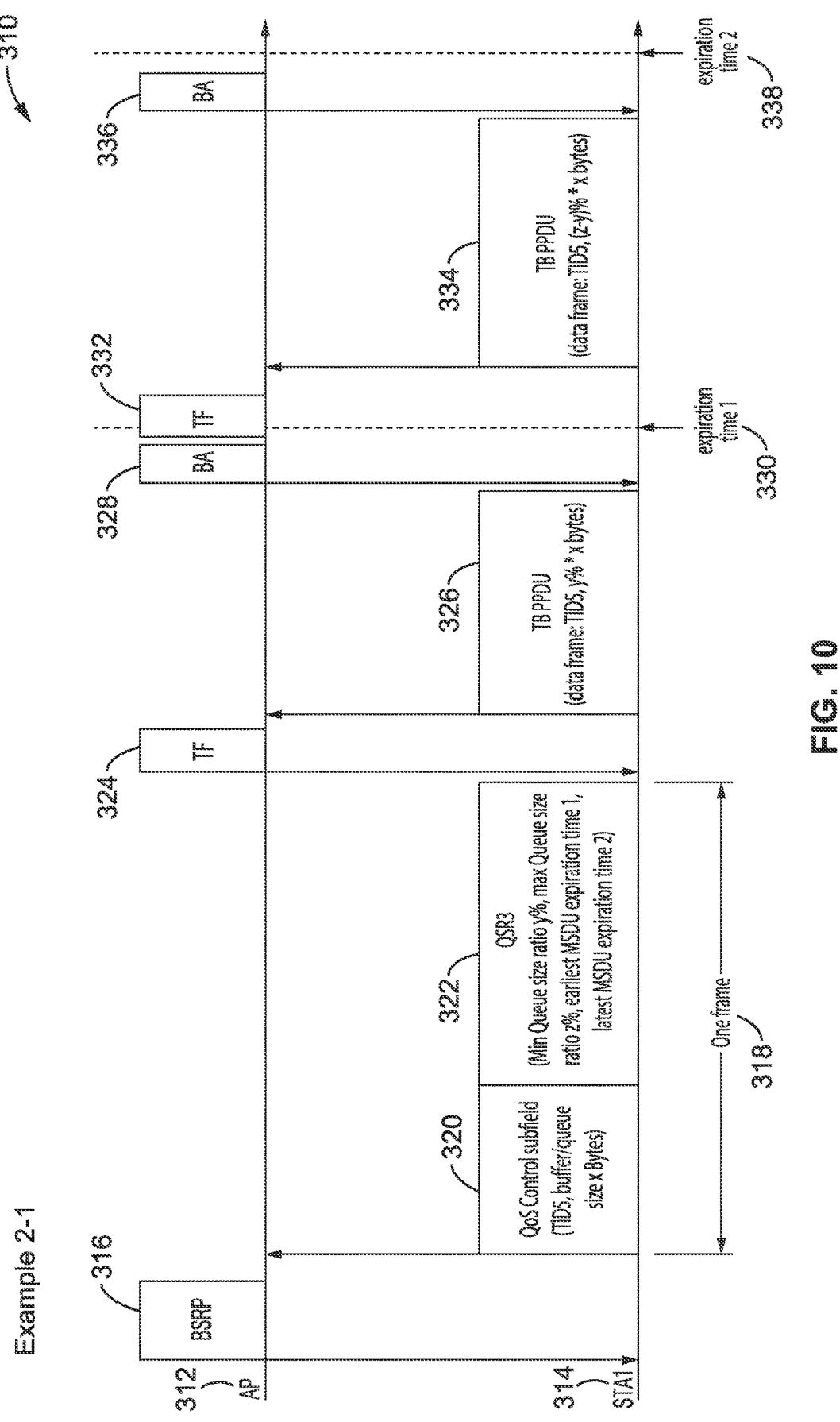
FIG. 10 is a communications diagram, as Example 2-1, of QSR reporting buffer size of a TID associated with a QoS control subfield, according to at least one embodiment of the present disclosure.

FIG. 10 illustrates an Example 2-1 embodiment 310 of QSR reporting buffer size of a TID associated with a QoS control subfield (seen in FIG. 9). The figure depicts example communications between AP 312 and STA1 314.

Figure 11:
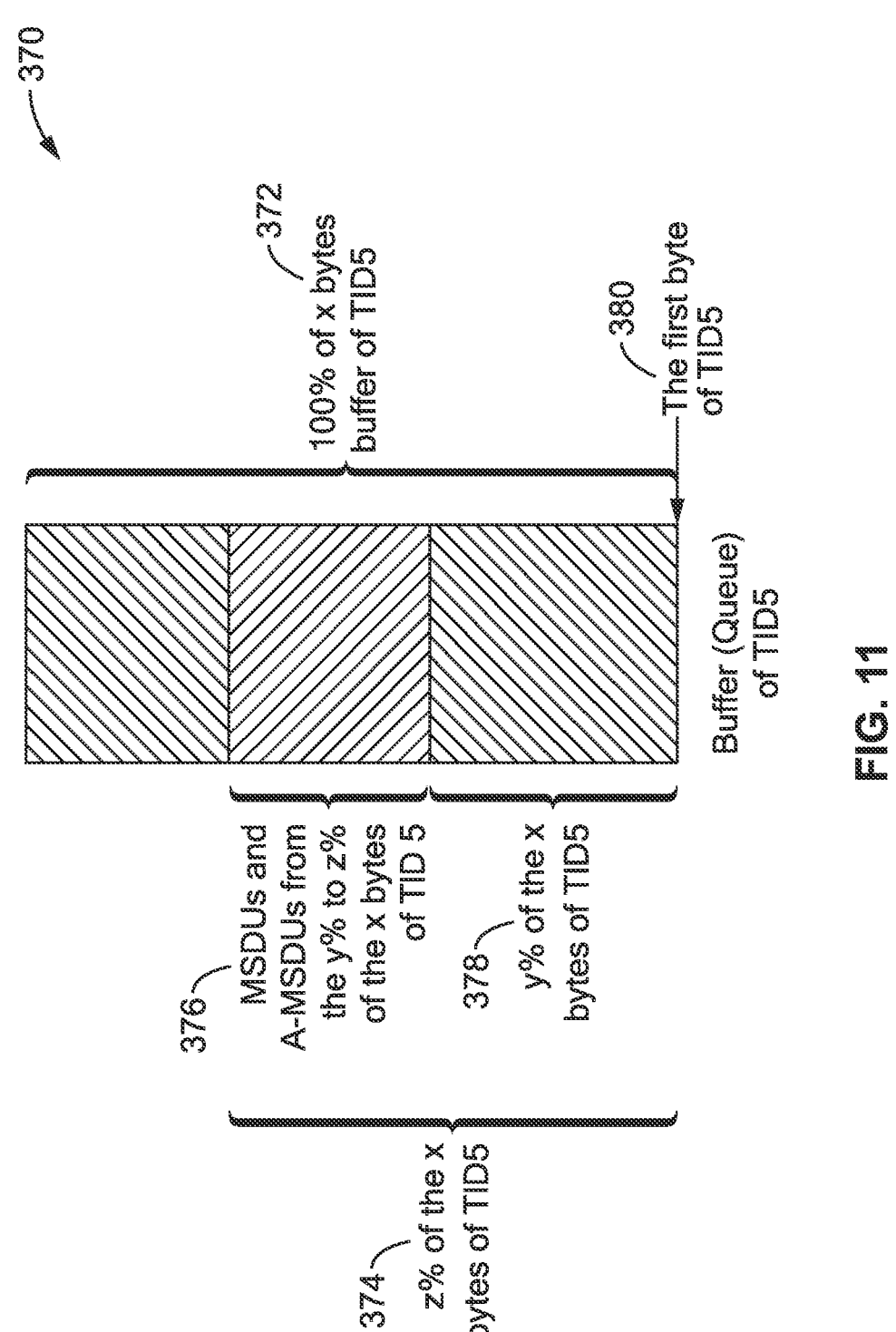
FIG. 11 is a queue content diagram of buffer status of TID5 of STA1 for FIG. 10, according to at least one embodiment of the present disclosure.

FIG. 11 illustrates an example embodiment 370 of the buffer status of TID5 of STA1. The figure shows 100% 372 of x bytes of the buffer for TID5, it also shown the z % 374 of the x bytes of TID5, the MSDUs and A-MSDUs from the y % to z % of the bytes of TID5 376, and the y % bytes 378 of the x bytes of TID5. The first byte 380 of TID5 is also shown.

Referring again to FIG. 10, the AP sends an BSRP trigger frame 316 to its associated STA, denoted by STA1 314. Then, STA1 responds with a QoS Null frame 318 carrying QoS control subfield 320 and QSR, denoted by QSR3 322, to the AP. In the QoS Control subfield, STA1 reports that it has x bytes of TID5 in its buffer. Then, in QSR3 322, it reports that the earliest MSDU expiration time and the latest MSDU expiration time of the MSDUs and A-MSDUs from the y % to z % of the x bytes of TID5 376 (of FIG. 11) having expiration time 1 and expiration time 2, respectively. That is, the MSDUs and A-MSDUs from the y % to z % 376 (FIG. 11) of the x bytes of TID5 will expire between expiration time 1 330 and expiration time 2 338.

Assuming that all the MSDUs and A-MSDUs are sorted in an increasing order of expiration time (i.e., the MSDU or A-MSDU with earlier expiration time will be buffered at the position closer to the queue head). Then, QSR3 also indicates that there is y % 378 (FIG. 11) of the x bytes of TID5 whose expiration time is before expiration time 1 330 and there are (100%-z %) of the x bytes of TID5 whose expiration time is after expiration time 2 338.

According to the two expiration times reported in QSR3, the AP sends a trigger frame (TF) 324 seen in FIG. 10, first to trigger the y % of x bytes immediately in order to finish the transmission of those bytes before expiration time 1. STA1 is seen transmitting a TB PPDU 326 having a data frame with TID5, y % times x bytes, whose receipt is acknowledged with BA 328.

The AP then sends another TF 332 to trigger the (z-y) % of x bytes to finish the transmission of those bytes, seen as TB PPDU 334 having data frame with TID5, (z-y) % times x bytes, before expiration time 2 338. The AP responds to the TB PPDU with BA 336.

Figure 12:
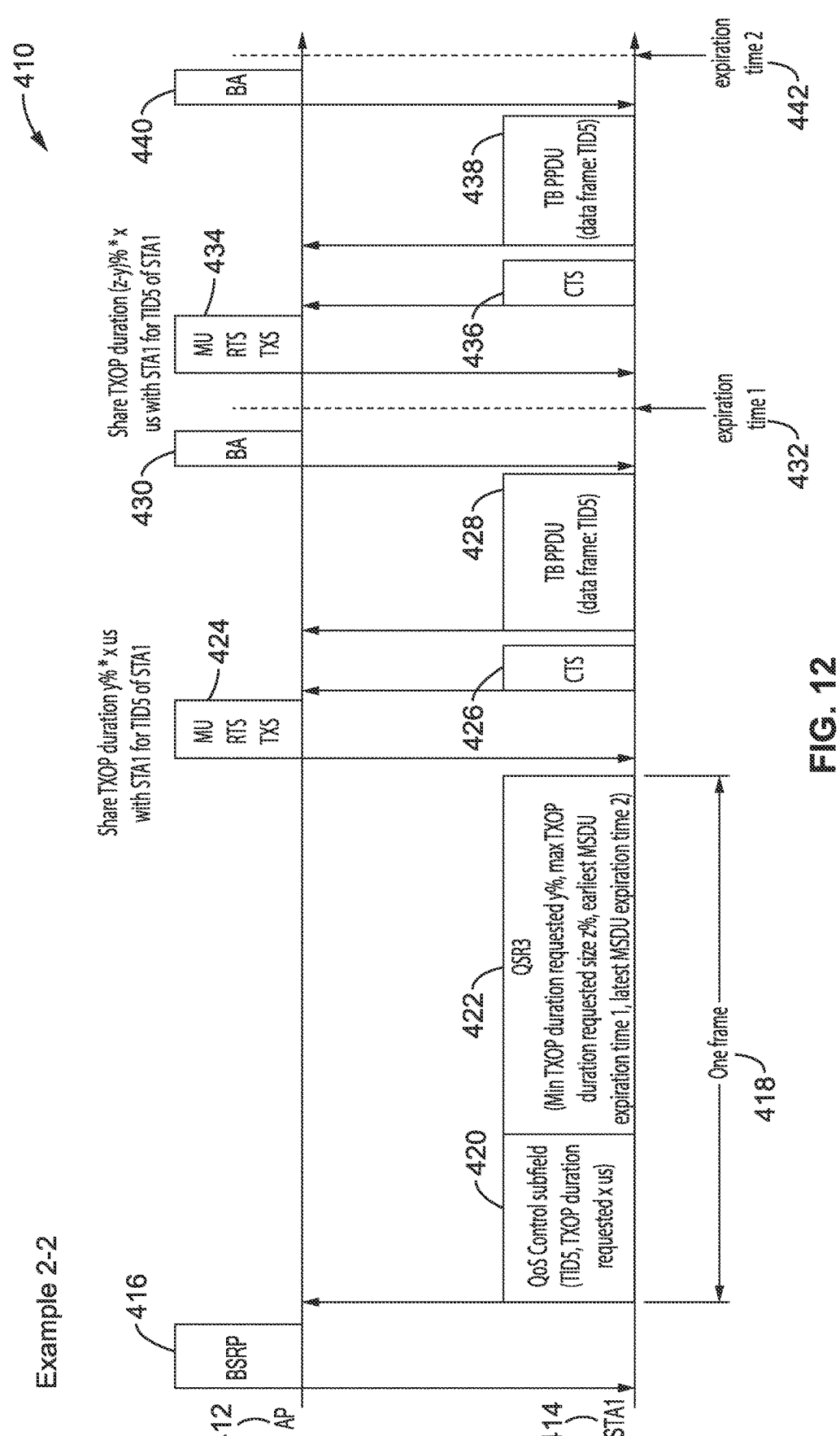
FIG. 12 is a communications diagram, as Example 2-2, of QSR reporting TXOP duration requested of a TID associated with the QoS control subfield, according to at least one embodiment of the present disclosure.

FIG. 12 illustrates an Example 2-2 embodiment 410 of QSR reporting TXOP duration requested of an TID in associated with QoS control subfield. The figure illustrates examples communications from AP 412 and STA1 414.

The AP sends a BSRP trigger frame 416 to its associated STA, denoted by STA1. Then, STA1 responds with a QoS Null frame 418 carrying QoS control subfield 420 and QSR 422, denoted by QSR3, to the AP. In the QoS Control subfield 420, STA1 reports that it requires x μs for the transmission of its buffer of TID5. Then, in QSR3 422, it reports that the earliest MSDU expiration time and the latest MSDU expiration time of the MSDUs and A-MSDUs from the y % to z % of the x μs requested TXOP duration of TID5 are expiration time 1 and expiration time 2, respectively. That is, the MSDUs and A-MSDUs from the y % to z % of the x μs requested TXOP duration of TID5 will expire between expiration time 1 and expiration time 2. It is assumed in this example that all the MSDUs and A-MSDUs are sorted by increasing order of expiration time (i.e., the MSDU or A-MSDU with earlier expiration times being buffered at positions closer to the queue head). Then, QSR3 also indicates that there is y % of the x μs requested TXOP duration of TID5 whose expiration time is before expiration time 1 and there are (100%-z %) of the x μs requested TXOP duration of TID5 whose expiration time is after expiration time 2.

According to the two expiration times 432 and 442 reported in QSR3, AP sends a MU RTS TXS trigger frame 424 first to trigger the TXOP sharing with STA1 for the y % of x μs immediately in order to complete the transmission of the corresponding bytes before expiration time 1. The figure shows STA1 responding with a Clear-To-Send (CTS) 426 followed by sending a TB PPDU 428 containing a data for TID5. The AP acknowledges receipt of this PPDU with BA 430, which is seen in this example occurring just prior to expiration time 1 432.

The AP then sends another MU RTS TXS trigger frame 434 to share the TXOP with STA1 for the (z-y) % of x μs TXOP duration to complete (finish) the transmission of the corresponding bytes before expiration time 2 442. STA1 responds to the MU RTS with a Clear-To-Send (CTS) 436, and transmits a TB PPDU 438 with a data frame for TID5. The transmission is then acknowledged 440 by the AP.

6.6. Example 3

Figures 13, 14:
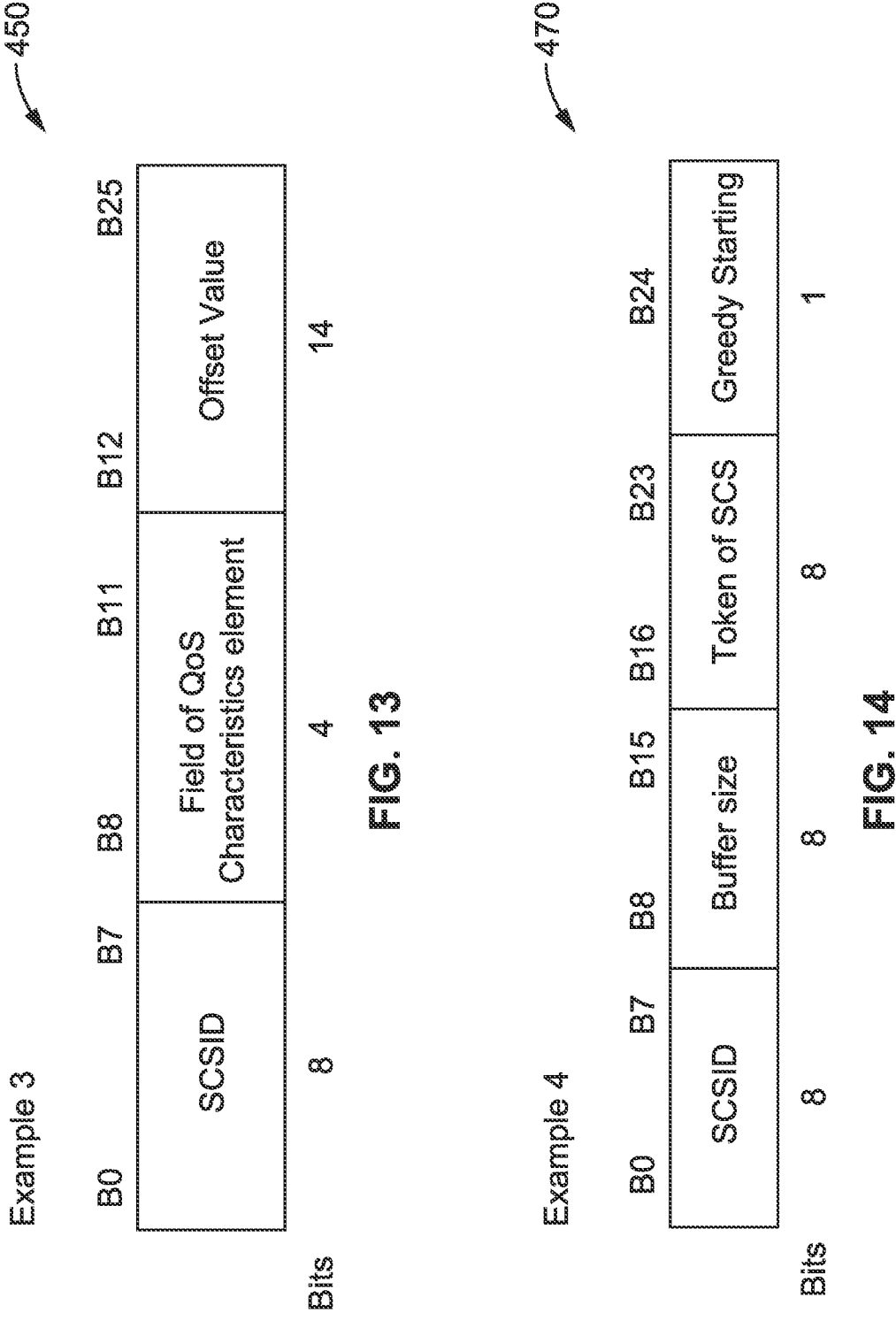
FIG. 13 is a data field diagram of a QSR to change the parameters of a QoS characteristics element of an existing SCS, as part of Example 3, according to at least one embodiment of the present disclosure.
FIG. 14 is a data field diagram of a Control Information subfield in a QSR Control subfield, as part of Example 4, according to at least one embodiment of the present disclosure.

FIG. 13 illustrates an example embodiment 450 of the format of a QSR to change the parameters of a QoS characteristics element of an existing SCS. It should be noted that the bit size of each subfield in the QSR can be changed as previously indicated.

An SCS ID (SCSID) subfield is set to the identification of an existing SCS that is established between the non-AP and the AP.

A Field of QoS Characteristics Element, is a field that is set to indicate the corresponding field of the QoS characteristics element of the SCS indicated in the SCSID subfield. Each value can be set to represent a field of the QoS characteristics element as seen in Table 3.

An Offset Value field is set to indicate the change of the value compared with the value set in the QoS characteristics element. When the AP receives this field, it will change the value of the corresponding subfield in the QoS characteristics element of the SCS. For example, assuming that the offset value subfield has x bits (e.g., 14 bits as shown in the figure), and the non-AP sets the offset value to y. Then, the AP will change (add or subtract) the value of the corresponding subfield in the QoS characteristics element of the SCS by $y-2^x$. In other words, if the value of the subfield in the QoS characteristics element of the SCS is z before the AP receives the QSR, then the AP should change it to $z+y-2^x$ after it receives QSR. If the AP cannot satisfy the QoS requirement of the SCS after the parameter change, it may terminate the SCS.

Table 3 Example of encoding of Field of QoS Characteristics element subfield.

6.7. Example 4

In Example 4 a QSR is used for reporting the status of an existing SCS.

FIG. 14 illustrates an Example 4 embodiment 470 of a Control Information subfield format in a QSR Control subfield. In this example field, it should be noted that the bit size of each subfield in the QSR can be changed, without departing from the teachings of the present disclosure. The fields of the Control Information subfield are as follows.

An SCSID subfield is set to the identification of an existing SCS that is established between the non-AP and the AP.

A Buffer size subfield is set to the (MAC layer) buffer or queue size (in units of bytes, or in units of percentage of buffer size of the corresponding TID reported by the TID control subfield in the same frame) of the SCS as indicated in the SCSID subfield at the time the non-AP reports the QSR. When the Buffer size is set to a value in units of bytes, it can be separated by a scaling factor subfield and a queue size subfield (e.g., seen in FIG. 2). It should be noted that the buffer size field is optional in at least one embodiment of the present disclosure.

A Token of SCS field is set to the bits worth of tokens, denoted by I(t0) where t0 is the time the QSR is transmitted, in the SCS as indicated in the SCSID subfield at the time the non-AP reports the QSR. This then allows the AP to understand the status of the bucket model of the SCS at that time. This field can be set to a value in unit of bytes, or in unit of percentage of the burst size in the QoS characteristics element of the SCS. When this field is set to a value in unit of bytes, it can be separated by a scaling factor subfield and a subfield similar to queue size as shown in FIG. 2.

A Greedy Starting subfield is set to a first state (e.g., "1") to indicate that the SCS is greedy starting (which involves using a different method of predicting buffer size) at the time the non-AP STA transmits QSR. Otherwise, this field is set to a second state (e.g., "0").

The QSR in this example can help the AP to predict the buffer status of the SCS in the near (immediate) future and allocate resources for the transmission of the up-coming MSDUs and A-MSUDs in advance. For example, if the peak rate of the SCS is denoted by C (bytes per second), buffer size reported by the QSR is Q at time t0, then the AP can expect that the buffer size x(t) of the SCS that requires to be transmitted from the non-AP STA by time t will be: $x(t)=Min[C*(t-t0), I(t0)+(t-t0)*\rho]+Q$ if the greedy starting is set to 1, where p is the average sustainable rate. The value of p is equal to the mean data rate in the QoS characteristics element of the SCS: $Q<x(t)<Min[C*(t-t0), I(t0)+(t-t0)*\rho]+Q$ (or $Min[C\_min*(t-t0), I(t0)+(t-t0)*\rho]+Q<x(t)<Min[C*(t-t0), I(t0)+(t-t0)*\rho]+Q$, where C_min is the minimum data rate in the QoS characteristics element of the SCS) if the greedy starting is set to a second state (e.g., "0").

It at least one embodiment, this QSR information only takes effect for a short (selected) period of time, such as: (a) until the current TXOP (the TXOP during which the QSR is sent) ends, or (b) until the current R-TWT SP (the SP during which the QSR is sent) ends, or (c) until a certain period of time, such as 3 ms, which can be predetermined by the network system. In at least one embodiment this time information is also carried by the QSR control subfield (which is not shown in the figure).

In at least one embodiment it is possible to add another peak rate subfield in QSR (not shown in the figure) in FIG. 14.

When the Greedy starting subfield is set to a second state (e.g., "0"), then this subfield is set to a value C which represents the peak rate of the SCS, or this subfield can be reserved.

When the Greedy starting subfield is set to a second state (e.g., "0"), then this subfield is set to a value C_notpeak<C and the buffer size $x(t)=Min[C\_notpeak*(t-t0), I(t0)+(t-t0)*\rho]+Q$.

It is possible that the x(t) represents: (a) the amount of buffer to be delivered by time t, or (b) The amount of buffer arriving at the buffer by time t.

6.7. Example 4-1

Figure 15:
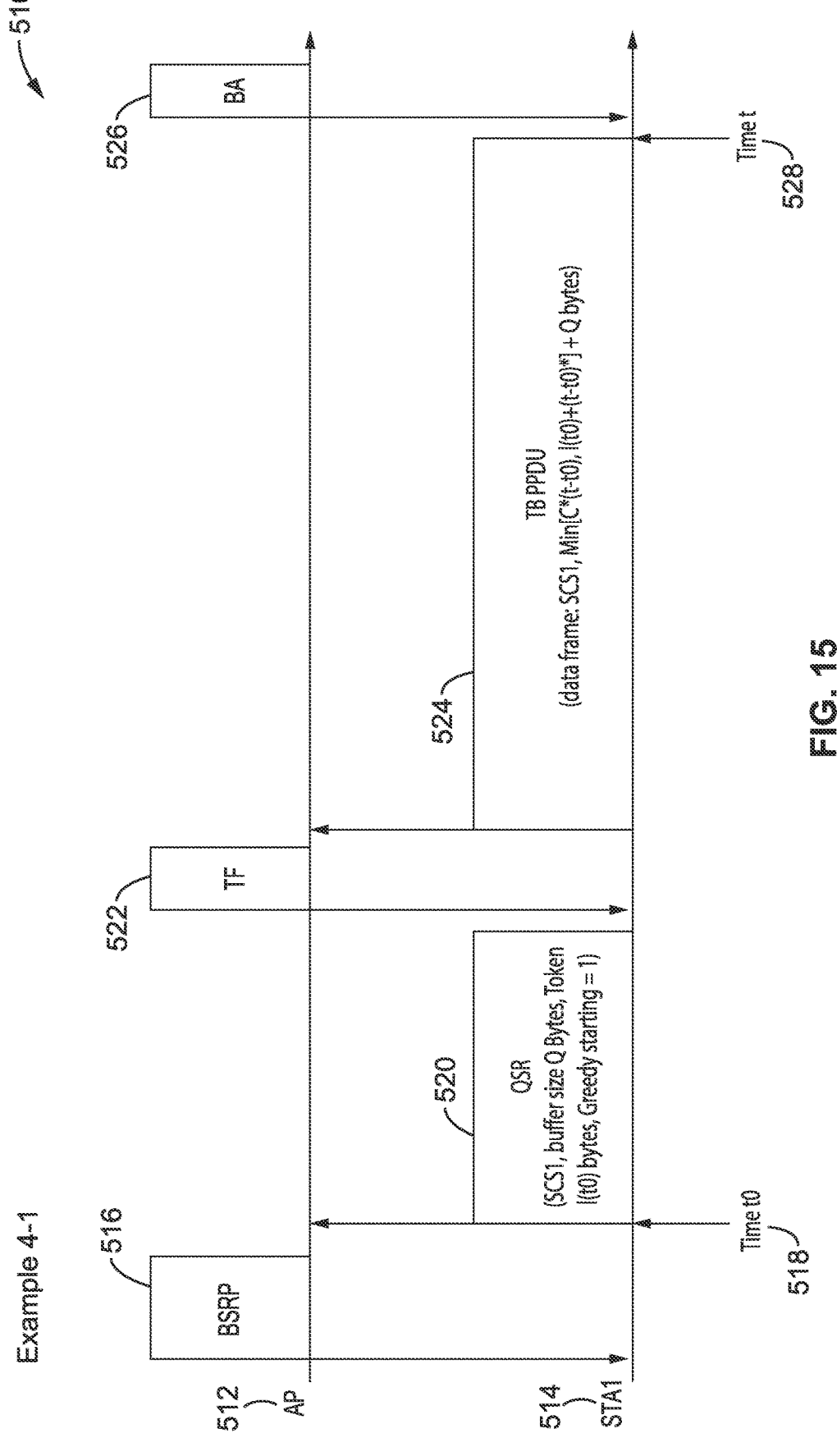
FIG. 15 is a communications diagram of an AP scheduling TB PPDU for the buffer arriving in the near future following QSR status reporting of an existing SCS, as part of Example 4-1, according to at least one embodiment of the present disclosure.

FIG. 15 illustrates an Example 4-1 embodiment 510 of an AP scheduling TB PPDU for the buffer arriving in the near future according to the QSR reporting the status of an existing SCS. The figure depicts communications between AP 512 and STA1 514.

The AP sends a BSRP trigger frame 516 to its associated STA, denoted by STA1. Then, STA1 responds at time0 518 with a QoS Null frame 520 carrying a QSR to the AP. In the QSR, STA1 reports that the buffer size of SCS1 at time t0 is Q bytes, the token of SCS1 is I bytes, and the greedy starting is set to a first state (e.g., "1"). The AP can send a trigger frame 522 to trigger traffic 524 of SCS1 from STA1. The TB PPDU 524 ends at time t 528. Then the AP can expect to trigger $Min[C*(t-t0), I(t0)+(t-t0)*\rho]+Q$ bytes of SCS1 traffic from STA1. The AP responds to TB PPDU 524 with BA 526.

In some instances, the end time of TB PPDU can be later than time t, due to the low MCS or narrow RU of the TB PPDU.

In at least one embodiment the TB PPDU for the transmission of SCS1 can only start after time t1 when the expected buffer size of SCS1 at time t1 is $Min[C*(t1-t0), I(t0)+(t1-t0)*\rho]+Q>=L\_max$, where L_max is the max MSDU size in the QoS characteristics element of the SCS.

Figure 16:
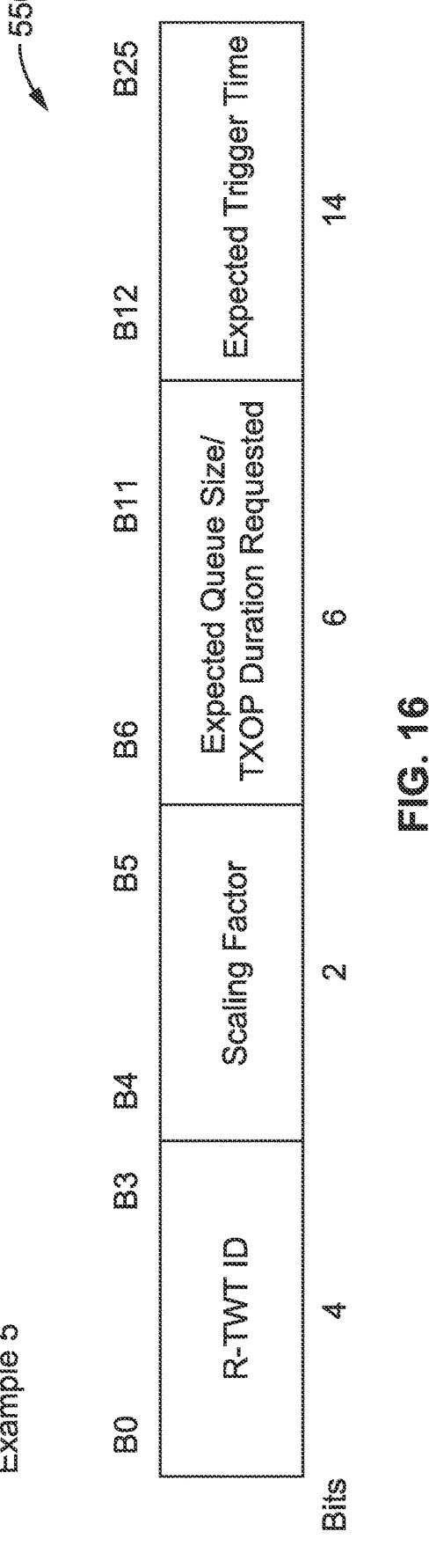
FIG. 16 is a data field diagram of format of QSR to report expected transmission during R-TWT SP, as part of Example 5, according to at least one embodiment of the present disclosure.

FIG. 16 illustrates an Example 5 embodiment 550 of the format of QSR to report expected transmission during R-TWT SP. As noted previously, the bit size of each subfield in the QSR could be changed.

An R-TWT ID subfield is set to the identification of the R-TWT during which the non-AP STA expects to transmit the buffer as reported in the QSR.

A Scaling Factor subfield can be identical to that shown in Example 1.

An Expected Queue Size/TXOP Duration Requested subfield represents expected Queue Size or expected TXOP Duration Requested. If this field contains expected Queue Size, then this field is set to the value in unit of bytes to indicate the amount of data that the non-AP STA requires to transmit during the SP of the R-TWT (e.g., triggered by the AP). If this field is expected TXOP Duration Requested, then this field is set to the TXOP duration that the non-AP STA expects that the AP triggers TXOP sharing during the SP of R-TWT.

It should be noted that there could be a one-bit indication subfield in QSR (not shown in FIG. 16) to indicate whether Expected Queue Size/TXOP Duration Requested subfield represents expected Queue Size or expected TXOP Duration Requested.

An Expected Trigger Time subfield is set to indicate the time frame in which the non-AP STA can anticipate the AP to trigger the transmission of the expected queue size or the TXOP sharing with expected Duration requested.

In at least one example embodiment, the QSR shown in Example 5 only takes effect for the up-coming or current SP of the R-TWT indicated in the R-TWT ID subfield.

In at least one embodiment, the QSR shown in Example 5 only takes effect for the current R-TWT SP. Then, the R-TWT ID field can be replaced by TID or ACI subfield to indicate the TID or AC information of the buffer reported in the QSR.

7. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A station apparatus for communication in a wireless network, the apparatus comprising: (a) at least one modem coupled to at least one radio-frequency (RF) circuit, with each RF circuit connected to one or multiple antennas; (b) wherein said station (STA) is configured as a separate STA or as a STA within a multiple-link device (MLD); (c) a processor of said STA; (d) a non-transitory memory storing instructions executable by the processor for wirelessly communicating with other STAs on a IEEE 802.11 wireless local area network (WLAN); and (e) wherein said instructions, when executed by the processor, perform steps of a wireless communications protocol, comprising: (e)(i) wherein said STA operates in the wireless communications protocol as either an Access Point (AP) STA or a non-AP STA, for communicating with other STAs using a carrier sense multiple access/collision avoidance (CSMA/CA) mechanism; (e)(ii) communicating medium access control (MAC) service data units (MSDUs), or aggregated-MSDUs (A-MSDUs), based on quality of service (QoS), from a buffer in MAC layers, and transmitting them as physical layer protocol data units (PPDUs) between the physical layers of the WLAN; (e)(iii) transmitting a QoS status report (QSR) from a non-AP STA to an AP STA, wherein said QSR comprises information on latency requirements of a certain portion of buffered MSDUs on said non-AP STA; and (e)(iv) receiving by the non-AP STA, from an AP STA, scheduling for a trigger-based transmission of buffered MPDUs indicated in the QSR toward satisfying latency requirement of those buffered MSDUs.

A station apparatus for communication in a wireless network, the apparatus comprising: (a) at least one modem coupled to at least one radio-frequency (RF) circuit, with each RF circuit connected to one or multiple antennas; (b) wherein said station (STA) is configured as a separate STA or as a STA within a multiple-link device (MLD); (c) a processor of said STA; (d) a non-transitory memory storing instructions executable by the processor for wirelessly communicating with other STAs on a IEEE 802.11 wireless local area network (WLAN); and (e) wherein said instructions, when executed by the processor, perform steps of a wireless communications protocol, comprising: (e)(i) wherein said STA operates in the wireless communications protocol as either an Access Point (AP) STA or a non-AP STA, for communicating with other STAs using a carrier sense multiple access/collision avoidance (CSMA/CA) mechanism; (e)(ii) communicating medium access control (MAC) service data units (MSDUs), or aggregated-MSDUs (A-MSDUs), based on quality of service (QoS), from a buffer in MAC layers, and transmitting them as physical layer protocol data units (PPDUs) between the physical layers of the WLAN; (e)(iii) transmitting a QoS status report (QSR) from a non-AP STA to an AP STA, wherein said QSR comprises information on latency requirements of a certain portion of buffered MSDUs on said non-AP STA; (e)(iv) wherein the QSR carries: (A) information on size of buffered MSDUs or A-MSDUs associated with the latency requirement in the QSR; (B) information on earliest expiration time of the MSDUs or A-MSDUs in the buffered traffic; (C) a report on buffers whose contents should shortly arrive, so that the AP can properly allocate resources for those buffer contents in advance; or a combination thereof; (e)(v) receiving by the non-AP STA, from an AP STA, scheduling for a trigger-based transmission of buffered MPDUs indicated in the QSR toward satisfying latency requirement of those buffered MSDUs.

A method for performing communications in a wireless network, comprising: (a) communicating wirelessly on a IEEE 802.11 wireless local area network (WLAN) between stations (STAs), configured as separate STAs or as a STAs within multiple-link device (MLDs), in performing a wireless communications protocol; (b) wherein said STAs operate in the wireless communications protocol as either Access Point (AP) STAs or a non-AP STAs, for communicating with other STAs using a carrier sense multiple access/ collision avoidance (CSMA/CA) mechanism; (c) communicating medium access control (MAC) service data units (MSDUs), or aggregated-MSDUs (A-MSDUs), based on quality of service (QoS), from a buffer in MAC layers, and transmitting them as physical layer protocol data units (PPDUs) between the physical layers of the WLAN; (d) transmitting a QoS status report (QSR) from a non-AP STA to an AP STA, wherein said QSR comprises information on latency requirements of a certain portion of buffered MSDUs on said non-AP STA; and (e) receiving by the non-AP STA, from an AP STA, scheduling for a trigger-based transmission of buffered MPDUs indicated in the QSR toward satisfying latency requirement of those buffered MSDUs.

Wireless communication apparatus or method for performing transmission of frames between the MAC layers of the IEEE 802.11 network, performing transmission of PPDUs between the PHY layers of the IEEE 802.11 network, STAs using CSMA/CA for channel contention, comprising: (a) a non-AP STA transmits a QoS status report (QSR) to the AP to provide latency requirement of a certain amount (a block) of its buffered traffic; and (b) the AP schedules trigger-based transmission for the buffered traffic in QSR to satisfy latency requirement of those buffered traffic.

The apparatus or method of any preceding implementation, wherein the QSR carries the information on latency requirements comprising traffic identification.

The apparatus or method of any preceding implementation, wherein the traffic identification comprises access class (AC), traffic identifier (TID), stream classification service identifier (SCSID).

The apparatus or method of any preceding implementation, wherein the QSR carries information on size of buffered MSDUs, or A-MSDUs, associated with the latency requirement in the QSR.

The apparatus or method of any preceding implementation, wherein the QSR carries information on earliest expiration time of the MSDUs or A-MSDUs in the buffered traffic.

The apparatus or method of any preceding implementation, wherein the earliest expiration time of the MSDUs or A-MSDUs in the buffered traffic comprises information on a time period in which the MSDU or A-MSDU is valid, and after which the validity of the MSDU or A-MSDU expires.

The apparatus or method of any preceding implementation, wherein the non-AP STA transmits multiple QSRs in a single PPDU to provide latency requirements for multiple blocks of buffered MSDUs.

The apparatus or method of any preceding implementation, wherein the QSR provides an indication that it is the first QSR of a TID in the transmitted PPDU, while the buffered traffic of the same TID is contained in additional QSRs in the transmitted PPDU that will expire later than the first QSR.

The apparatus or method of any preceding implementation, wherein the information in a subsequent QSR overrides information received in a previous QSR.

The apparatus or method of any preceding implementation, wherein the QSR carries information on number of tokens remaining in a token bucket for SCS traffic; wherein mean data rate, peak data rate, and burst size is given as parameters of a token bucket model in a traffic specification (TSPEC) element or QoS characteristics element.

The apparatus or method of any preceding implementation, wherein the QSR contains a report about buffers whose contents should shortly arrive, so that the AP can properly allocate resources for those buffer contents in advance.

The apparatus or method of any preceding implementation, wherein the QSR could carry the traffic identification, such as AC, TID, SCSID of the buffered traffic.

The apparatus or method of any preceding implementation, wherein the QSR could carry the size of the buffered traffic that is associated with the latency requirement in the QSR.

The apparatus or method of any preceding implementation, wherein the QSR could carry the earliest expiration time of the MSDUs or A-MSDUs in the buffered traffic (i.e., the time that the MSDU or A-MSDU has to be transmitted before) in the QSR.

The apparatus or method of any preceding implementation, wherein the non-AP STA could transmit multiple QSRs in the same PPDU to provide latency requirement of multiple blocks of buffered traffic.

The apparatus or method of any preceding implementation, wherein a QSR could indicate it is the first QSR of a TID in the PPDU and the buffered traffic of the same TID in the other QSRs in the same PPDU will expire later than the first QSR.

The apparatus or method of any preceding implementation, wherein the QSR of a TID/AC/SCSID in the PPDU could override the QSR of the same TID/AC/SCSID in the previous PPDU.

The apparatus or method of any preceding implementation, wherein the QSR could carry the amount of tokens left in the bucket for a SCS traffic. (Note that the mean data rate, the peak data rate, and the burst size in the TSPEC element or QoS characteristics element are the parameters of the token bucket model, which provides standard terminology for describing the behavior of a traffic source. The token bucket model is described in IETF RFC 2212 [B25], IETF RFC 2215 [B26], and IETF RFC 3290 [B35].)

The apparatus or method of any preceding implementation, wherein the QSR could report the buffer that will arrive in the near future so that the AP could allocate the resource for those buffer in advance.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| QoS Control Field | | | |
| --- | --- | --- | --- |
| Applicable Frame (sub) types | Bit 4 | Bit 7 | Bits 8-15 |
| QoS CF-Poll & QoS CF-Ack + CF-Poll frames sent by HC | EOSP | Reserved | TXOP Limit |
| QoS Data & QoS Data + CF-Poll & QoS data + CF + CF Poll frames sent by HC | EOSP | A-MSDU present | TXOP Limit |
| QoS Data & QoS Data + CF Ack frames sent by HC | EOSP | A-MSDU present | AP BS Buffer size |
| QoS Null frames sent by HC | EOSP | Reserved | AP BS Buffer size |
| QoS Data & QoS Data + CF Ack frames sent in a non-mesh BSS by non-AP STAs, that are not a TPU buffer STA or TPU sleep STA | 0 | A-MSDU present | TXOP Duration Requested |
| | 1 | A-MSDU present | Queue Size |
| QoS Null frames sent in a non-mesh BSS by non-AP STAs, that are not a TPU buffer STA or TPU sleep STA | 0 | Reserved | TXOP Duration Requested |
| | 1 | Reserved | Queue Size |
| QoS Data & QoS Data + CF Ack frames sent by TPU buffer STAs | EOSP | A-MSDU present | Reserved |
| QoS Null frames sent by TPU buffer STAs | EOSP | Reserved | Reserved |
| QoS Data & QoS Data + CF Ack frames sent by TPU sleep STAs | Reserved | A-MSDU present | Reserved |
| QoS Null frames sent by TPU sleep STAs | Reserved | Reserved | Reserved |
| All frames sent by mesh STAs in | EOSP | A-MSDU | MCP, PPSL, |

TABLE 1-continued

| QoS Control Field | | | |
| --- | --- | --- | --- |
| Applicable Frame (sub) types | Bit 4 | Bit 7 | Bits 8-15 |
| a mesh BSS | | present | RSPI, reserved |

Note:
Bits 0-3 = TID, Bits 5-6 = Ack Policy Indicator

TABLE 2

| Control ID Subfield Values | | |
| --- | --- | --- |
| Control ID value | Meaning | Length (bits) |
| 0 | Triggered Response Scheduling (TRS) | 26 |
| 1 | Operating Mode (OM) | 12 |
| 2 | HE link Adaptation (HLA) | 26 |
| 3 | Buffer Status Report (BSR) | 26 |
| 4 | UL Power Headroom (UPH) | 8 |
| 5 | Bandwidth Query Report (BQR) | 10 |
| 6 | Command And Status (CAS) | 8 |
| 7 | EHT Operating Mode (EHT OM) | 6 |
| 8 | Single Response Scheduling (SRS) | 10 |
| 9 | AP Assistance Request (AAR) | 20 |
| 10 | QoS Status Report (QSR) | 26 |
| 11-14 | Reserved | — |
| 15 | Ones Need Expansion Surely (ONES) | 26 |

TABLE 3

| Example of Encoding of Field of QoS Characteristics Element subfield | |
| --- | --- |
| Value of Field of QoS Characteristics element subfield | Corresponding field of QoS Characteristics element |
| 0 | Minimum Service Interval |
| 1 | Maximum Service Interval |
| 2 | Minimum Data Rate |
| 3 | Delay Bound |
| 4 | Maximum MSDU Size |
| 5 | Service Start Time |
| 6 | Mean Data Rate |
| 7 | Burst Size |
| 8 | MSDU Lifetime |
| 9 | MSDU Delivery Ratio |
| 10 | MSDU Count Exponent |
| 11 | Medium Time |

What is claimed is:

1. A station apparatus for communication in a wireless network, the apparatus comprising:
   (a) at least one modem coupled to at least one radio-frequency (RF) circuit, with each RF circuit connected to one or multiple antennas;
   (b) wherein said station (STA) is configured as a separate STA or as a STA within a multiple-link device (MLD);
   (c) a processor of said STA;
   (d) a non-transitory memory storing instructions executable by the processor for wirelessly communicating with other STAs on an IEEE 802.11 wireless local area network (WLAN); and
   (e) wherein said instructions, when executed by the processor, perform steps of a wireless communications protocol, comprising:
      (i) wherein said STA operates in the wireless communications protocol as either an Access Point (AP) STA or a non-AP STA, for communicating with other STAs using a carrier sense multiple access/collision avoidance (CSMA/CA) mechanism;

(ii) communicating medium access control (MAC) service data units (MSDUs), or aggregated-MSDUs (A-MSDUs), based on quality of service (QoS), from a buffer in MAC layers, and transmitting them as physical layer protocol data units (PPDUs) between the physical layers of the WLAN;

(iii) transmitting a QoS data frame containing one or more QoS status reports (QSRs) from a non-AP STA to an AP STA, wherein each said QSR comprises information on latency requirements including expiration time for a certain portion of bytes within buffered MSDUs for a given traffic identification on said non-AP STA, whereby other portions of said MSDUs of that traffic identification are subject to a later expiration time, or have no expiration time; and (iv) receiving by the non-AP STA, from an AP STA, scheduling for a trigger-based transmission of buffered MPDUs indicated in the QSR toward satisfying latency requirements whereby those certain portions of those buffered MSDUs for each given traffic identification are communicated prior to their expiration times.

2. The apparatus of claim 1, wherein the traffic identification comprises access class (AC), or traffic identifier (TID), or stream classification service identifier (SCSID), or a combination thereof.

3. The apparatus of claim 1, wherein the QSR carries information on size of buffered MSDUs, or A-MSDUs, associated with the latency requirement in the QSR.

4. The apparatus of claim 1, wherein the QSR carries information on earliest expiration time of the MSDUs or A-MSDUs in the buffered traffic.

5. The apparatus of claim 4, wherein the earliest expiration time of the MSDUs or A-MSDUs in the buffered traffic comprises information on a time period in which the MSDU or A-MSDU is valid, and after which the validity of the MSDU or A-MSDU expires.

6. The apparatus of claim 1, wherein the non-AP STA transmits multiple QSRs in a single PPDU to provide latency requirements for multiple blocks of buffered MSDUs.

7. The apparatus of claim 1, wherein the QSR provides an indication that it is the first QSR of a TID in the transmitted PPDU, while the buffered traffic of the same TID is contained in additional QSRs in the transmitted PPDU that will expire later than the first QSR.

8. The apparatus of claim 1, wherein the information in a subsequent QSR overrides information received in a previous QSR.

9. The apparatus of claim 1, wherein the QSR carries information on number of tokens remaining in a token bucket for SCS traffic; wherein mean data rate, peak data rate, and burst size is given as parameters of a token bucket model in a traffic specification (TSPEC) element or QoS characteristics element.

10. The apparatus of claim 1, wherein the QSR contains a report about buffers whose contents should shortly arrive, so that the AP can properly allocate resources for those buffer contents in advance.

11. A station apparatus for communication in a wireless network, the apparatus comprising:

(a) at least one modem coupled to at least one radio-frequency (RF) circuit, with each RF circuit connected to one or multiple antennas;

(b) wherein said station (STA) is configured as a separate STA or as a STA within a multiple-link device (MLD);

(c) a processor of said STA;

(d) a non-transitory memory storing instructions executable by the processor for wirelessly communicating with other STAs on an IEEE 802.11 wireless local area network (WLAN); and (e) wherein said instructions, when executed by the processor, perform steps of a wireless communications protocol, comprising:

(i) wherein said STA operates in the wireless communications protocol as either an Access Point (AP) STA or a non-AP STA, for communicating with other STAs using a carrier sense multiple access/collision avoidance (CSMA/CA) mechanism;

(ii) communicating medium access control (MAC) service data units (MSDUs), or aggregated-MSDUs (A-MSDUs), based on quality of service (QoS), from a buffer in MAC layers, and transmitting them as physical layer protocol data units (PPDUs) between the physical layers of the WLAN;

(iii) transmitting a QoS data frame containing one or more QoS status reports (QSRs) from a non-AP STA to an AP STA, wherein each said QSR comprises expiration time for a certain portion of bytes within buffered MSDUs for a given traffic identification on said non-AP STA, whereby other portions of that same traffic identification are subject to a later expiration time, or have no expiration time;

(iv) wherein the QSR carries: (A) information on size of buffered MSDUs or A-MSDUs associated with the latency requirement in the QSR; (B) information on earliest expiration time of the MSDUs or A-MSDUs in the buffered traffic; (C) a report on buffers whose contents should shortly arrive, so that the AP can properly allocate resources for those buffer contents in advance; or a combination thereof; and (v) receiving by the non-AP STA, from an AP STA, scheduling for a trigger-based transmission of buffered MPDUs indicated in the QSR toward satisfying latency requirement of those certain portions of buffered MSDUs within each given traffic identification can be communicated prior to its expiration times.

12. The apparatus of claim 11, wherein the traffic identification comprises access class (AC), or traffic identifier (TID), or stream classification service identifier (SCSID), or a combination thereof.

13. The apparatus of claim 11, wherein the earliest expiration time of the MSDUs or A-MSDUs in the buffered traffic comprises information on a time period in which the MSDU or A-MSDU is valid, and after which the validity of the MSDU or A-MSDU expires.

14. The apparatus of claim 11, wherein the non-AP STA transmits multiple QSRs in a single PPDU to provide latency requirements for multiple blocks of buffered MSDUs.

15. The apparatus of claim 11, wherein the QSR provides an indication that it is the first QSR of a TID in the transmitted PPDU, while the buffered traffic of the same TID is contained in additional QSRs in the transmitted PPDU that will expire later than the first QSR.

16. The apparatus of claim 11, wherein the information in a subsequent QSR overrides information received in a previous QSR.

17. The apparatus of claim 11, wherein the QSR carries information on number of tokens remaining in a token bucket for SCS traffic; wherein mean data rate, peak data rate, and burst size is given as parameters of a token bucket model in a traffic specification (TSPEC) element or QoS characteristics element.

18. A method for performing communications in a wireless network, comprising:

(a) communicating wirelessly on an IEEE 802.11 wireless local area network (WLAN) between stations (STAs), configured as separate STAs or as a STAs within multiple-link device (MLDs), in performing a wireless communications protocol;

(b) wherein said STAs operate in the wireless communications protocol as either Access Point (AP) STAs or a non-AP STAs, for communicating with other STAs using a carrier sense multiple access/collision avoidance (CSMA/CA) mechanism;

(c) communicating medium access control (MAC) service data units (MSDUs), or aggregated-MSDUs (A-MSDUs), based on quality of service (QoS), from a buffer in MAC layers, and transmitting them as physical layer protocol data units (PPDUs) between the physical layers of the WLAN;

(d) transmitting a QoS data frame containing one or more QoS status reports (QSRs) from a non-AP STA to an AP STA, wherein each said QSR comprises information on latency requirements including expiration time for a certain portion of bytes within buffered MSDUs for a given traffic identification on said non-AP STA, whereby other portions of that traffic identification are subject to a later expiration time, or have no expiration time; and (e) receiving by the non-AP STA, from an AP STA, scheduling for a trigger-based transmission of buffered MPDUs indicated in the QSR toward satisfying latency requirements whereby those certain portions of those buffered MSDUs for each given traffic identification can be communicated prior to their expiration times.

* * * * *